United States Patent [19]
Wozniak

[11] Patent Number: 5,705,757
[45] Date of Patent: Jan. 6, 1998

[54] APPARATUS AND METHOD FOR MEASURING TORQUE AND POWER

[75] Inventor: Michael C. Wozniak, De Pere, Wis.

[73] Assignee: C. A. Lawton, De Pere, Wis.

[21] Appl. No.: 734,180

[22] Filed: Oct. 21, 1996

[51] Int. Cl.[6] .................................................. G01L 1/22
[52] U.S. Cl. ................................. 73/862.338; 73/862.28
[58] Field of Search ..................... 73/862.28, 862.325, 73/862.338, 862.339, 862.191

[56] References Cited

U.S. PATENT DOCUMENTS

| | | | |
|---|---|---|---|
| 2,949,029 | 8/1960 | Bayles et al. | 73/862.28 |
| 3,201,982 | 8/1965 | Kennedy | 73/862.28 |
| 3,251,223 | 5/1966 | Barg | 73/862.338 X |
| 3,555,894 | 1/1971 | Bratkowski | 73/862.338 X |
| 3,691,825 | 9/1972 | Dyer | 73/862.339 |
| 3,728,896 | 4/1973 | Sheldon et al. | 73/862.339 |
| 3,950,986 | 4/1976 | Parkinson | 73/862.28 |
| 4,530,248 | 7/1985 | Munson | 73/862.28 X |
| 4,763,533 | 8/1988 | Uitermarkt | 73/1 C X |

*Primary Examiner*—Elizabeth L. Dougherty
*Attorney, Agent, or Firm*—Hill, Steadman & Simpson

[57] ABSTRACT

An apparatus and method for measuring torque imposed on a drive shaft and horsepower transmitted to a drive shaft are provided. The apparatus includes four strain gauges mounted onto the drive shaft. The strain gauges are connected to a transmitter which is accommodated within a rotating collar mounted onto the drive shaft. The changes in resistances of the strain gauges are then transmitted by the transmitter to a receiver. Strain level is then calculated from the measurement of the changes in resistivity and torque may be calculated from the strain level calculation. A means for measuring rpm or rotational velocity is provided which, in combination with the torque calculation, results in a means for calculating the power transmitted to the drive shaft.

10 Claims, 8 Drawing Sheets

FIG. 7  DRYER SECTION - BRAKING TORQUE

APPARATUS AND METHOD FOR MEASURING TORQUE AND POWER

BACKGROUND OF THE INVENTION

The present invention relates generally to diagnostic techniques. More specifically, the present invention relates to the measurement of torque imposed on a rotating drive shaft and the power expended in rotating a drive shaft.

Drive shafts are commonly used in industrial machines to impart rotation or movement to other machine parts or to articles being manufactured. Often, a drive shaft is linked to a longer shaft, such as a line shaft which is driven by a single power source. For example, in paper making machines, and specifically older paper making machines, the line shaft is connected to a single power source such as a steam turbine or an electric motor. The line shaft extends the length of the paper making machine, which may be the length of a football field. Individual sections, having its own drive shaft, are in turn driven via a set of pulleys that are connected to the line shaft. A typical paper making machine may have as many as ten sections, each with their own drive shaft. The drive shaft and drive components for each particular section are designed for the theoretical power required by that section.

However, while each section is designed for the theoretical power required for that section, the full power of the line shaft is available for any particular section. When problems arise in any section, such as a worn out bearing, water build-up in a dryer, or jamming of paper in the machine, an increased amount of power is transferred from the line shaft to the drive shaft of the particular section experiencing difficulty. The power transmitted may then exceed the capacity of the section drive components causing premature failure of the section drive components, often with dangerous or catastrophic consequences.

Typically, items such as gears are the first to fail because the actual power transmitted through the drive shaft is far greater than the amount of power the gears were intended to handle. To complicate matters, there has been no efficient method or apparatus for measuring the amount of torque applied to a drive shaft or the amount of power transmitted to the drive shaft. Because there has been no way to determine or monitor the torque or power, operators are unaware of how much torque or power is being applied to a drive shaft when specific difficulties or error situations arise.

For example, common problems such as bad bearings, misalignment, flooded dryers or gear boxes near failure all require a significant increase in the power being transmitted through these components, which may exceed their rated capacities. When the full power of the prime mover or line shaft is available for any particular section of the line shaft, the power being consumed by any one section cannot be accurately determined. Accordingly, trouble-shooting becomes problematic.

Further, in the example of paper making machines, there is a need for a method or apparatus for accurately measuring the "draw" between sections of the paper machines. The term "draw" is an indicator of tension in the paper sheet between two sections of a machine. The tension is created by running one section at a slightly higher speed than a previous section. As a result, a sheet of paper will slip on the rolls which creates tension in the sheet. Of course, if the draw or tension imposed on the sheet of paper becomes excessive, the sheet can break which will result in an interruption of the paper making process.

Therefore, there is a need for a convenient method and/or apparatus for monitoring the torque applied to drive shafts of industrial equipment and preferably including a means for measuring the power expended on rotating these drive shafts. Further, there is a need for a method and apparatus for monitoring and measuring torque as a result of draw variations in a paper making machine and similar machines. By providing such an apparatus and method, operators will be able to monitor the individual sections of their operation more efficiently and further understand which operating conditions require the most amount of additional torque and power and, therefore, which operating conditions need to be addressed on a priority basis.

SUMMARY OF THE INVENTION

The present invention satisfies the aforenoted needs by providing an apparatus and method for measuring torque load imposed on a drive shaft during rotation thereof as well as a method and apparatus for measuring power transmitted to a drive shaft. The apparatus of the present invention comprises four strain gauges or two pairs of strain gauges mounted on the drive shaft. The two pairs of strain gauges can be mounted in a diametrically opposed relation to one another on the shaft or along the same side of the shaft at alternating positive and negative 45° angles to form a general "W" configuration. The strain gauges are connected electrically to a means for measuring changes in the resistance of the strain gauges which are caused by any change in length of the strain gauges. The strain gauges will change in length when strain or stress is imposed on the rotating drive shaft.

Typically, the strain gauges comprise a Wheatstone bridge. When the resistors of a Wheatstone bridge are stretched, the resistances are changed and these changes are detected. Other types of strain gauges are available and known to those skilled in the art. The means for measuring changes in the resistance of the strain gauges then communicates any measured changes in the resistance to a transmitter, also located on the drive shaft. Preferably, the transmitter is housed within a collar which is attached around the drive shaft. Still more preferably, the collar is provided in at least two semi-circular pieces that are attached together, around the drive shaft. In this manner, the collar and strain gauges may be mounted onto the drive shaft without any disassembly of the drive shaft or related parts. The transmitter then transmits the measured changes and resistance of the strain gauge to a receiver. Preferably, the receiver includes a display. Also preferably, the collar that houses the transmitter includes an antenna to facilitate the transmission of the measured changes and resistance of the strain gauge to the receiver.

The strain imposed on the drive shaft may be calculated from the measured changes in resistance of the strain gauge. Torque may then be calculated from the strain as discussed below in the detailed description of the presently preferred embodiments.

If it is desired to measure power transmitted to the drive shaft, the apparatus should include a means for measuring the rotational velocity of the drive shaft, or the rotations per minute (rpm). Such a means could include a target, such as a magnet attached to the drive shaft and a proximity sensor or switch disposed adjacent to the rotating drive shaft. The switch or sensor may then be connected to an interface or directly to a computer. The receiver would also then be connected to an interface or directly to a computer. Power or horsepower could then be calculated from the just-calculated torque as discussed below.

In an embodiment, the present invention includes four strain gauges or two separate pairs of strain gauges and attached to the drive shaft at diametrically opposing sides thereof. The purpose of utilizing two pairs of strain gauges is to compensate for any bending or axial loads experienced by the drive shaft. Specifically, any curvature experienced on the surface of the drive shaft at one point on the drive shaft will be opposite to that experienced at a diametrically opposed point on the drive shaft. Hence, any curvature or bending of the drive shaft will be compensated for and canceled out of the strain measurement.

In another embodiment, the four strain gauges may be mounted on the same side of the shaft at alternating positive and negative 45° angles with respect to each other to compensate for any bending of the shaft.

The present invention also provides a method for measuring the strain or torque imposed on a drive shaft. The method includes the steps of measuring the change and resistance of a plurality of strain gauges mounted onto the drive shaft, transmitting the measured changes in resistance to a receiver, communicating the measured changes in resistance from a receiver to a computer or processor, calculating the strain imposed on the drive shaft from the measured change in resistances of the strain gauges and thereafter calculating the torque from the calculated strain level. If it is desired to calculate the power transmitted to the drive shaft, the method should further include the steps of measuring the rotational velocity or rpm of the drive shaft, communicating the measured rotational velocity or rpm to the computer or processor and thereafter calculating the power expended on the rotation of the drive shaft from the measured rotational velocity or rpm and the calculated torque.

The present invention also provides a method of retrofitting a drive shaft so that torque imposed on the drive shaft during rotation thereof can be measured. The method of retrofitting a drive shaft includes steps of attaching four strain gauges to the drive shaft, connecting each stain gauge to a means for measuring changes in resistance of the strain gauges caused by any change in length of the strain gauges resulting from strain imposed on the drive shaft, attaching a transmitter to the drive shaft, connecting the means for measuring changes in resistances of the strain gauges to the transmitter, providing a receiver at a remote location from the drive shaft for receiving the measured changes in resistances of the strain gauges from the transmitter, providing a computer for calculating strain and torque from the measured changes in resistances of the strain gauges and establishing communication between the computer and the receiver. Further, if it is desired to calculate the power transmitted to the drive shaft, the method should include the further steps of providing a means for measuring the rotational velocity or rpm of the drive shaft and establishing communication between the computer and the means for measuring the rotational velocity. The computer will then calculate the power transmitted to the drive shaft from the calculated torque and rotational velocity.

An advantage of the methods and apparatuses of the present invention is that the strain data is collected during the operation of the machinery. By collecting data during real time, the cause and effect of various changes in the torque imposed on the drive shaft can be monitored. For example, if an event happens during the operation of the machinery which may effect the torque or horsepower required, the time of that event can be noted and compared with the data recorded in the process of practicing the present invention. Similarly, if any significant change in horsepower or torque is noted from the collected data, an investigation into the operation and maintenance records of the machine may identify the cause and effect of such an occurrence.

Another advantage of the present invention is the ability to change the frequency of data collection and storage. In a preferred embodiment, the data may be collected at extremely short time intervals, such as microseconds, or at longer time intervals. Accordingly, data may be printed out or plotted at shorter time intervals for immediate evaluation and stored at longer time intervals which lowers the data storage requirements of the system.

It is therefore an object of the present invention to provide an apparatus for measuring torque imposed on a drive shaft during rotation thereof.

Another object of the present invention is to provide an apparatus for measuring power to a rotating drive shaft.

Still another object of the present invention is to provide an apparatus for measuring torque imposed on a drive shaft that may be incorporated into an existing system without disassembling the drive shaft or related drive components.

Still another object of the present invention is to provide a convenient way to monitor drive shaft strain and torque.

Another object of the present invention is to provide a convenient way to monitor power transmitted to a drive shaft.

Yet another object of the present invention is to provide an apparatus and method for measuring and monitoring drive shaft strain, torque and horsepower while compensating for any bending or axial loads imposed on the drive shaft.

Other objects and advantages of the present invention will become apparent upon reading the following detailed description and appended claims, and upon reference to the accompanying drawings.

BRIEF DESCRIPTION OF THE DRAWINGS

For a more complete understanding of this invention, reference should now be made to the embodiment illustrated in greater detail in the accompanying drawings and described below by way of examples of the invention.

It should be understood that the drawings are not necessarily to scale and that the embodiment is illustrated by graphic symbols and diagrammatic representations. Details which are not necessary for an understanding of the present invention or which render other difficult to perceive have been omitted. It should be understood, of course, that the invention is not necessarily limited to the particular embodiments illustrated herein.

DETAILED DESCRIPTION OF THE PRESENTLY PREFERRED EMBODIMENTS

Figure 1:
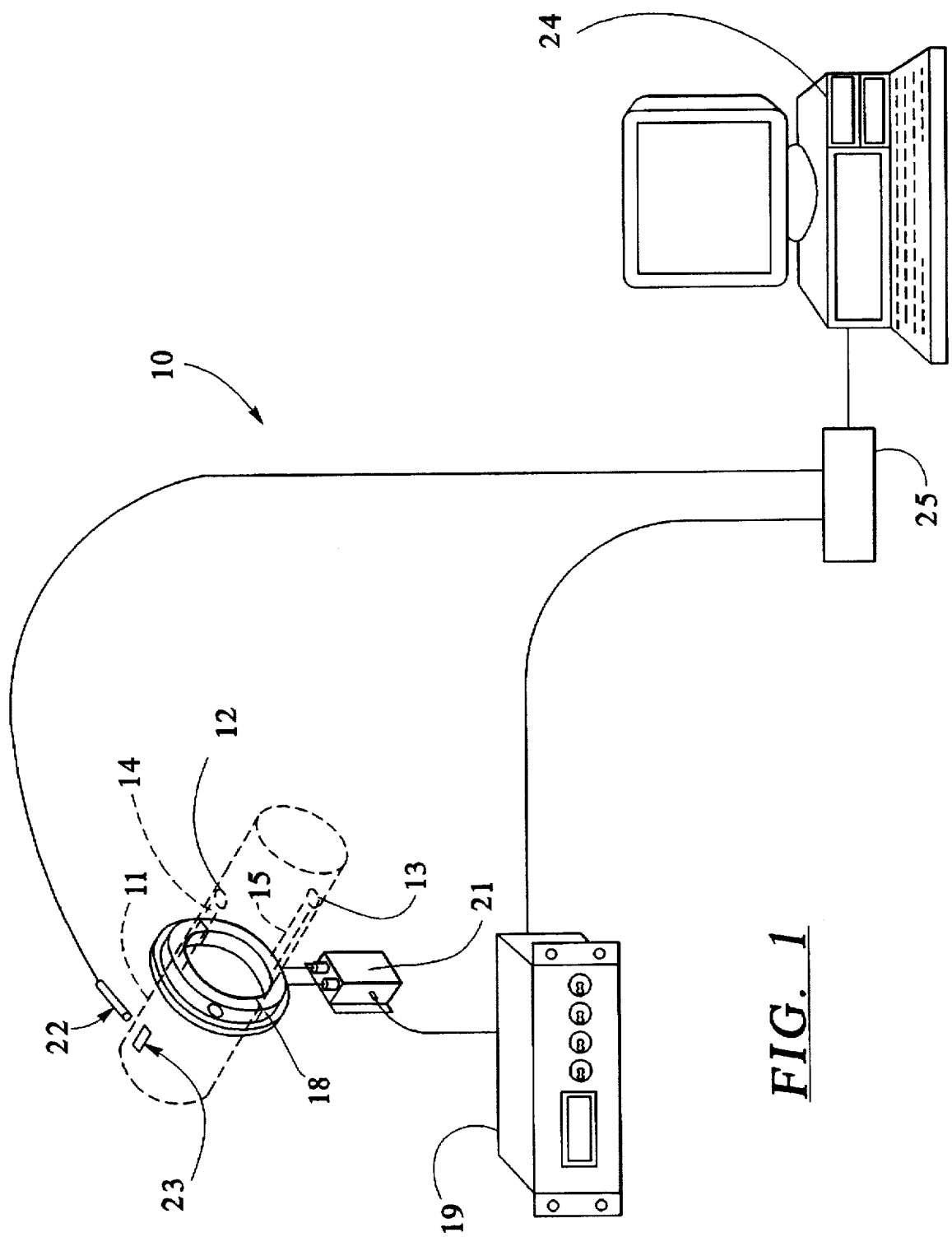
FIG. 1 is a schematic illustration of the apparatus of the present invention as installed on a drive shaft.

FIG. 1 is a schematic illustration of an apparatus 10 that measures and monitors strain and torque imposed on the drive shaft 11 during rotation thereof and also for the measurement of horsepower transmitted to a drive shaft 11. The apparatus 10 includes two pairs of strain gauges shown at 12 and 13 for a total of four strain gauges. When strain or stress is experienced by the drive shaft 11, the drive shaft 11 will twist or flex in response to the stress. Any twisting or flexing of the drive shaft 11 will result in a stretching or stress imposed upon the strain gauges 12, 13. As a result, the resistivity of the strain gauges 12, 13 will change. These changes are communicated to the collar 18 by way of the wiring shown at 14, 15. The collar 18 houses a transmitter (not shown) which transmits the changes in resistivity of the strain gauges 12, 13 to a receiver 19. To facilitate this transmission, the collar 18 may also include an antenna (not shown). An induction power supply is shown at 21 which provides power to the transmitter. Preferably, the strain gauges 12, 13 consist of a Wheatstone bridge.

In the event that power or horsepower expended during the rotation of the drive shaft is to be calculated, a means for measuring the rotational velocity or rpm of the drive shaft is provided by a sensor 22 which senses a target 23 as the target 23 rotates in front of the sensor 22. Information from the sensor 22 and the receiver 19 may be transmitted through an interface 25 to a computer 24 or directly to a computer 24.

The strain level in a drive shaft is a function of the shaft diameter, the modulus of the rigidity of the material from which the shaft is constructed, and the applied torque. This relationship is illustrated in Equation 1 below.

$$E_g = \frac{8 d_g T}{\pi G (d_0^4 - d_i^4)} \quad (1)$$

where $E_g$ is strain level in units of inches per inch, T is applied torque in inch-pounds, G is modulus of rigidity in pounds per square inch, $d_g$ is diameter at which the strain level is calculated, usually $d_o$ or $d_i$, $d_o$ is shaft outside diameter, and $d_i$ is shaft inside diameter.

In the case of the solid shaft 11 with the strain measurement taking place at the outside diameter as illustrated in FIG. 1 with the two pairs of strain gauges 12, 13, Equation 1 can be reduced to the following:

$$E_g = \frac{8T}{\pi G d_0^3} \quad (2)$$

Typical values for the modulus of rigidity (G) for several materials are shown in the table below.

TABLE 1

| Material | G (million psi) |
|---|---|
| Steel | 11.9 |
| Aluminum | 3.85 |
| Titanium | 6.54 |
| Magnesium | 2.5 |

Through an appropriate calibration technique, the strain level may be calculated from the change in resistivity experienced by the strain gauges 12, 13. An appropriate calibration technique employs a shunt calibration resistor. An example of the shunt calibration technique is provided in Technical Note 501, incorporated herein by reference and published by the Wireless Data Corporation, 620 Clyde Avenue, Mountainview, Calif. 94043. Hence, using the changes in resistivity experienced at strain gauges 12, 13, the strain level $E_g$ may be calculated and the torque may be calculated from Equation 2.

Torque, horsepower and revolutions per minute are directly related as shown in Equation 3 below.

$$T = \frac{63.025 \text{ horsepower}}{\text{rpm}} \quad (3)$$

where torque is in inch-pounds. Using the rpm or rotational velocity measurement provided by the sensor 22 and target 23, and the torque calculated from Equation 2, horsepower may be calculated from Equation 3.

Figure 2:
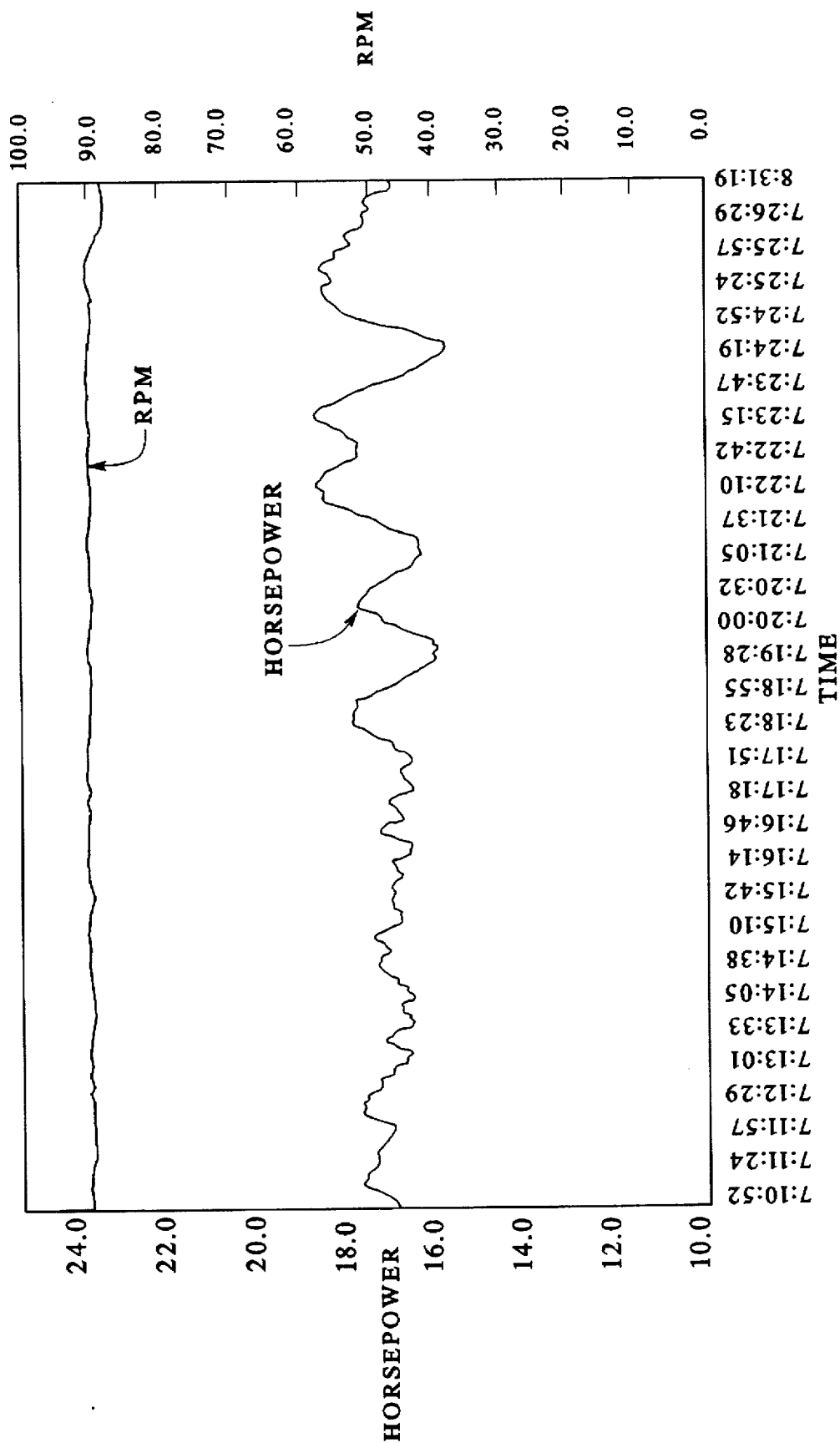
FIG. 2 is a graph illustrating the variation in horsepower while a drive shaft of a paper making machine was operated at a near constant rpm.
Figure 3:
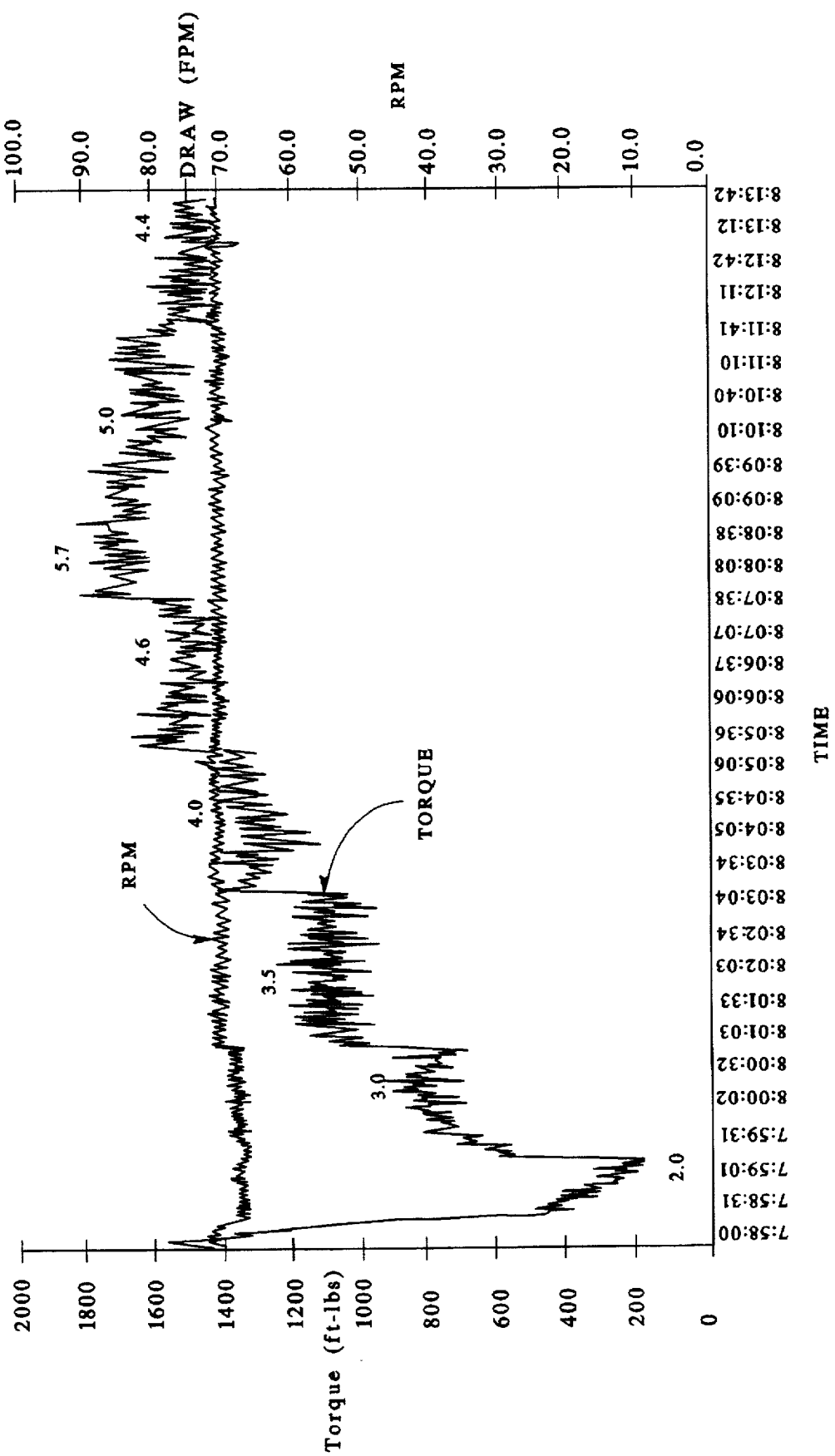
FIG. 3 is a graph illustrating the effect of reel draw variations on the torque required while maintaining a near constant rpm.

Using an apparatus fabricated in accordance with the present invention, the data illustrated in FIGS. 2-8 was generated. In FIGS. 2-5, the data illustrated was acquired when the apparatus illustrated in FIG. 1 was installed on the drive shaft of the reel of a 150 inch trim paper making machine operating at 1200 FPM and producing 35-80 pound fine paper. The machine operates with a line shaft drive using taper cone pulleys for power transmission and draw control from the line shaft to the drive shaft. FIG. 2 illustrates the drive shaft during normal operation. Even though the rpm of the drive shaft remained relatively constant, the horsepower fluctuated between 17 and 19. In FIG. 3, the draw or difference in speed between the reel and the previous section of a paper making machine were varied while the rpm was maintained at a near constant level.

Figure 4:
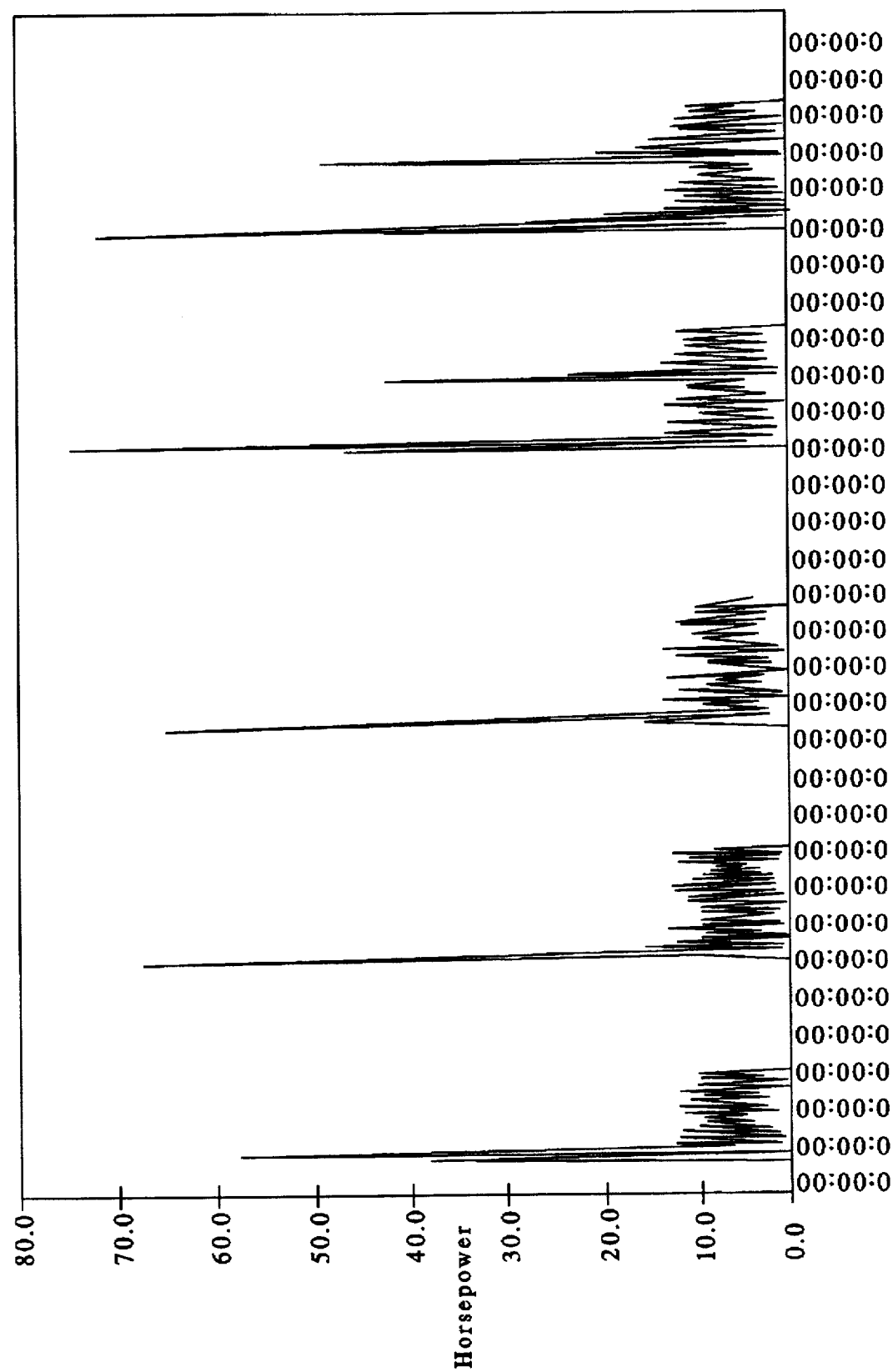
FIG. 4 is a graph illustrating the horsepower loads on the drive shaft of a paper making machine when the machine is being re-started after a sheet break.
Figure 5:
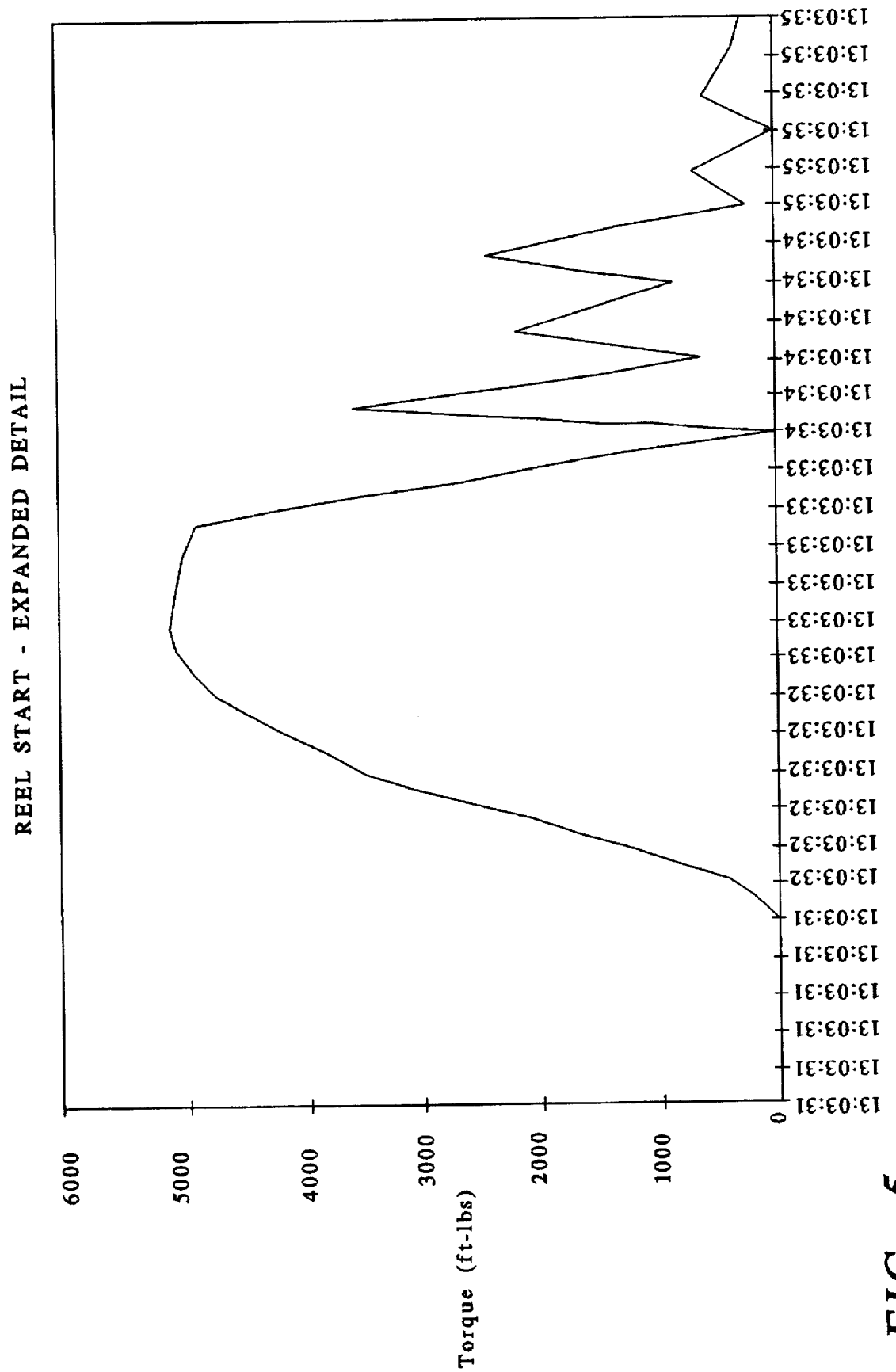
FIG. 5 is an expanded graph of the fourth drive shaft start illustrated in FIG. 4, further illustrating the increase in torque during the start-up process.

FIG. 4 illustrates the increase in horsepower required to start up a reel mounted onto the drive shaft after a sheet break with a half-full reel spool. As illustrated in FIG. 4, the peak loads of horsepower are required to start the reel. A secondary spike in the horsepower demand is shown at the two reel-starts illustrated at the right of FIG. 4 which illustrates the effects of bringing down an empty spool in the primary arms to begin the turn-up cycle. FIG. 5 is an expanded illustration of the fourth reel-start illustrated in FIG. 4.

Figure 6:
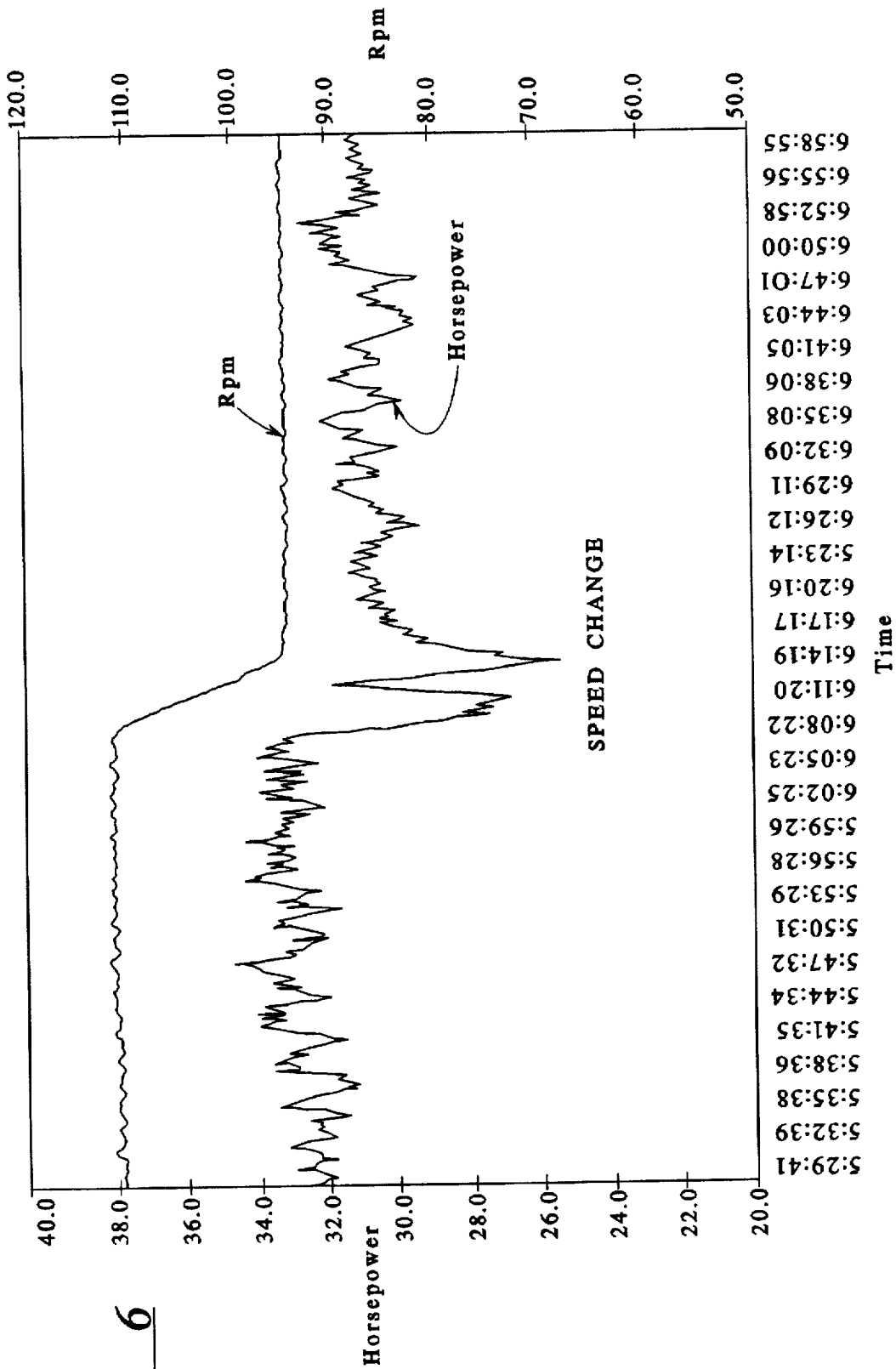
FIG. 6 is a graph illustrating normal operating conditions for a drive shaft in the dryer section of a paper making machine.
Figure 7:
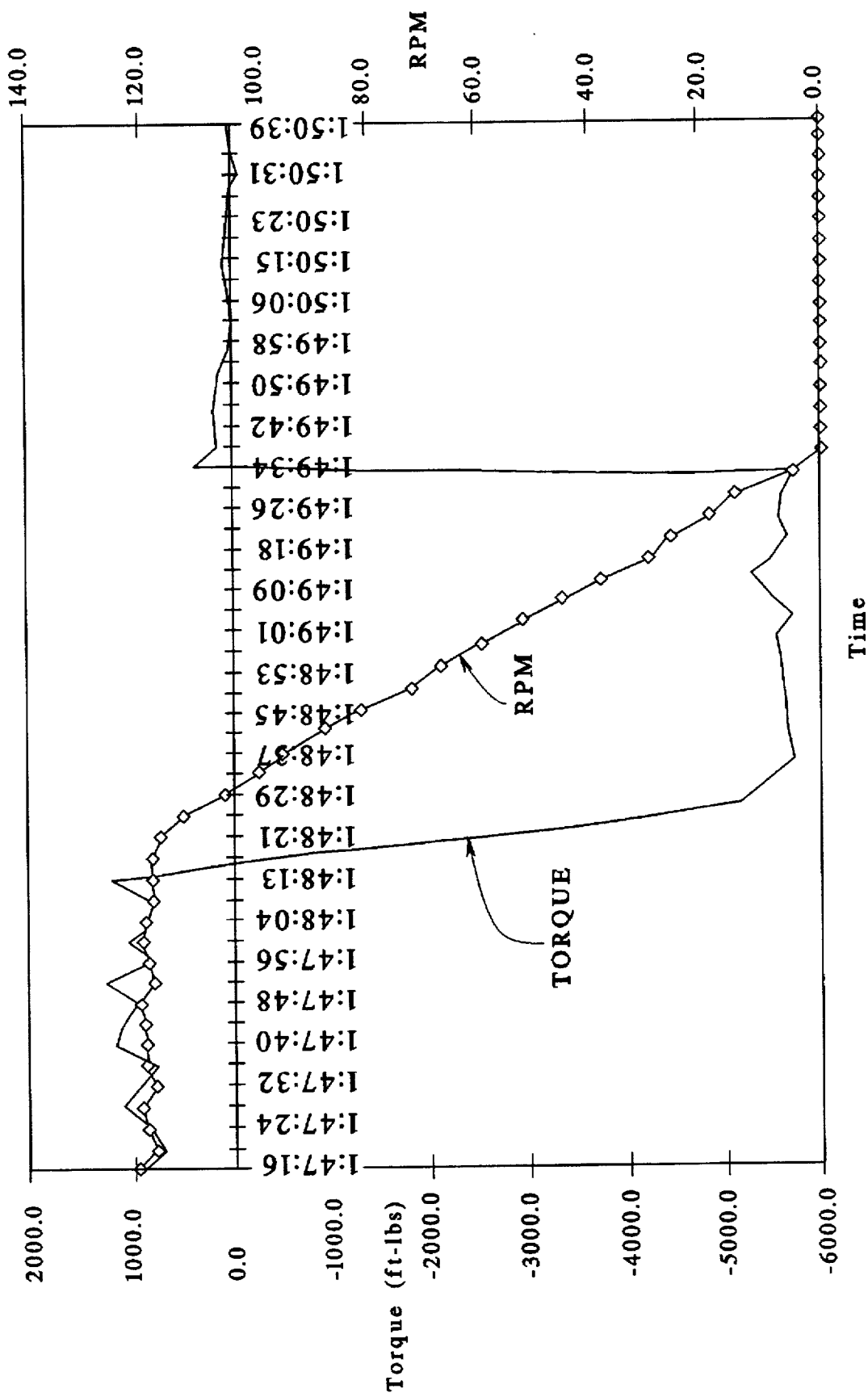
FIG. 7 is a graph illustrating the effect of stopping the machine illustrated in FIG. 6.

FIG. 6 illustrates data generated by the system on a dryer section of a 240 inch trim, 2200 FPM fine paper machine. The machine uses a line shaft and a taper cone pulley drive system. Measurements of the normal operating conditions are illustrated in FIG. 6. FIG. 7 illustrates the effects of stopping the machine and particularly the increase in torque experienced as the rpm drops to zero. It took approximately one and one-half minutes to stop the machine. The brake was applied when the shaft was rotating at approximately 110 rpm. The torque applied was a constant 5500 ft-lbs, or almost four times the normal running torque of approximately 1000 ft-lbs as illustrated in FIG. 7. The corresponding maximum horsepower was in excess of 115 as opposed to the desired range of 30-35 horsepower.

Figure 8:
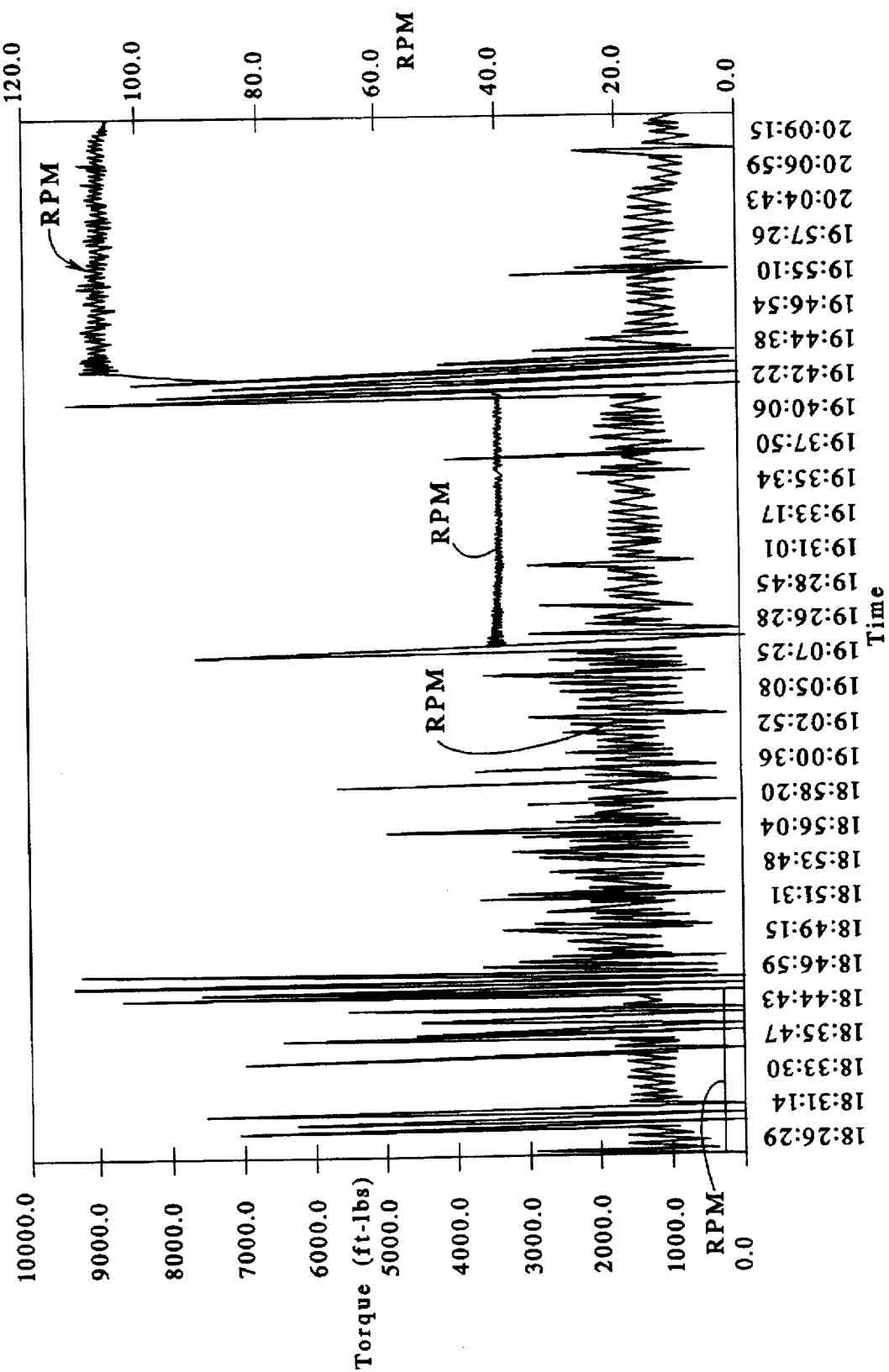
FIG. 8 is a graph illustrating the effect of the start-up or re-start of the machine illustrated in FIGS. 6 and 7.

FIG. 8 illustrates the effects of starting up the machine. During machine start-up, the machine is brought back to operating speed in several stages, with the drive shaft rotating at 4, 20 and 40 before reaching the operating speed of approximately 108 rpm. During each period of acceleration, torque loads of 9000 ft-lbs were observed, even though the acceleration from 40 rpm to 108 rpm took over 2 minutes. These loads are six times the normal running load as illustrated in the left hand side of FIG. 7. Further, during the acceleration when the machine was operating at 4 rpm, torque loads spiked to the 7000 ft-lb range. These load spikes continued during acceleration but decreased in frequency as the machine speed increased.

By employing the apparatus and methods of the present invention as illustrated and described above, operators can now monitor the torque level and horsepower requirements more precisely and avoid premature machine failure and breakdowns. In addition to providing important operational data, the apparatus and methods of the present invention will provide important information in troubleshooting machine failures. The apparatus and methods of the present invention are applicable to any industrial drive system and are specifically applicable to paper making machines.

For example, in a liner board machine having open spur gearing and frequent problems with the breakage of nylon dryer gears on the bottom tier, the methods and apparatus of the present invention can be used to determine if maximum torque loads transmitted through the pinion exceed the load capacity of the nylon gear teeth. As another example, a paper mill having problems with a D.C. drive on the wire turning roll kicking-out during normal operation, the methods and apparatus of the present invention can be used to determine whether torque overload is causing the drive to shut down. Specifically, the methods and apparatus of the present invention can be used to determine if torque spikes occur similar to those shown in FIG. 8. As another example, the methods and apparatus of the present invention can be used with a paper machine that is being re-built for speed increase to determine if the drive components can tolerate the increase in speed and power transmitted.

As is apparent from the foregoing description, the present invention is susceptible of being embodied with various alterations and modifications which may differ particularly from those that have been described in the preceding specification and description. It should be understood that the inventors wish to embody within the scope of the patent warranted hereon all such modifications that reasonably and properly come within the scope of the inventor's contribution to the art.

What is claimed is:

1. An apparatus for measuring torque load imposed on a drive shaft during rotation thereof, the apparatus comprising:

four strain gauges mounted onto the drive shaft, the strain gauges being connected to a first means for measuring changes in resistances of the strain gauges caused by any change in length of the strain gauges resulting from strain imposed on the drive shaft, the first means for measuring changes in resistances communicating measured changes in resistances of the strain gauges to a transmitter, the transmitter being mounted to a collar attached to the drive shaft and through which the drive shaft passes, the transmitter transmitting said measured changes in resistances of the strain gauges by radio signals to a receiver, the collar further comprising an antenna for transmitting the measured changes to the receiver, the receiver being located at a remote location from the drive shaft, the receiver generating a strain level signal based on said measured changes in resistance, the collar further comprising two semi-circular segments, the segments being connected together around the drive shaft without any disassembly of the drive shaft, means for measuring the rotational velocity of the drive shaft, said means for measuring the rotational velocity of the drive shaft generating a rotational velocity signal.

2. The apparatus of claim 1 wherein each strain gauge comprises a Wheatstone bridge.

3. The apparatus of claim 1 wherein the means for measuring the rotational velocity sends the rotational velocity signal to a computer and the receiver sends the strain signal to the computer.

4. The apparatus of claim 3 wherein the computer samples the rotational velocity signal and strain signal at a predetermined frequency.

5. The apparatus of claim 4 wherein the predetermined frequency can be varied.

6. An apparatus for measuring torque load imposed on a drive shaft during rotation thereof, the apparatus comprising:

four strain gauges, mounted onto the drive shaft, each of said strain gauges comprising a Wheatstone bridge mounted onto the drive shaft, each of said strain gauges being connected to a means for measuring changes in resistances of the strain gauges caused by any changes in length of the strain gauges resulting from strain imposed on the drive shaft, said means for measuring changes in resistances communicating measured changes in resistances to a transmitter, the transmitter being mounted to a collar attached to the drive shaft and through which the drive shaft passes, the transmitter transmitting said measured changes in resistances by radio signals to a receiver located at a remote location from the drive shaft, the collar further comprising an antenna for transmitting the measured changes to the receiver, the receiver generating a strain signal from the measured changes in resistance, the collar further comprising two semi-circular segments, the segments being connected together around the drive shaft without any disassembly of the drive shaft, means for measuring the rotational velocity of the drive shaft, said means for measuring the rotational velocity of the drive shaft generating a rotational velocity signal, said means for measuring the rotational velocity and said receiver being linked to a computer.

7. The apparatus of claim 6 wherein the computer samples the rotational velocity and strain signals at a predetermined frequency.

8. The apparatus of claim 7 wherein the predetermined frequency may be varied.

9. A method of measuring torque imposed on a drive shaft, the method comprising the following steps:

measuring the changes in resistances of four strain gauges mounted onto the drive shaft caused by any change in length of the strain gauges resulting in strain imposed on the drive shaft, communicating any measured changes in resistance of the strain gauges to a transmitter, transmitting the measured changes in resistances to a receiver with the transmitter, the transmitter being mounted to a collar mounted onto the drive shaft without disassembly of the drive shaft, the collar further comprising two semi-circular segments connected together and around the drive shaft without any disassembly of the drive shaft, the collar further comprising an antenna for transmitting the measured changes to the receiver, comparing the measured changes in resistances with pre-determined calibrated values to generate a strain signal, communicating the strain level from the receiver to a computer, calculating torque from the strain signal, measuring the rotational velocity of the drive shaft, generating a rotational velocity signal, communicating the rotational velocity signal to the computer, calculating power expended on the rotation of the drive shaft from the rotational velocity signal and the torque.

10. A method of retrofitting a drive shaft so that torque imposed on the drive shaft during rotation thereof can be measured, method of retrofitting comprising the following steps:

attaching four strain gauges to the drive shaft, connecting the strain gauges to a means for measuring changes in resistances of the strain gauges caused by any change in length of the strain gauges resulting from strain imposed on the drive shaft, attaching a transmitter to the drive shaft by attaching a collar, in which the transmitter is disposed, around the drive shaft, the collar further comprising an antenna for transmitting the measured changes to the receiver and the collar further comprising two semi-circular segments, the semi-circular segments being connected together around the drive shaft without any disassembly of the drive shaft, connecting the means for measuring changes in resistances to the transmitter, providing a receiver at a remote location from the drive shaft for receiving said measured changes in resistances of the strain gauges from the transmitter, establishing communication between the receiver and a computer, providing a means for measuring the rotational velocity of the drive shaft, establishing communication between the computer and the means for measuring the rotational velocity.

* * * * *

UNITED STATES PATENT AND TRADEMARK OFFICE
CERTIFICATE OF CORRECTION

PATENT NO. : 5,705,757
DATED : January 6, 1998
INVENTOR(S) : Michael C. Wozniak

It is certified that error appears in the above-identified patent and that said Letters Patent is hereby corrected as shown below:

Col. 6, line 26, delete "were" and insert --was-- therefor

Col. 7, line 30, delete "inventors wish" and insert --inventor wishes-- therefor Col. 9, line 5, delete "method" and insert --the method-- therefor Signed and Sealed this Thirty-first Day of August, 1999

Attest:

Q. TODD DICKINSON

Attesting Officer     Acting Commissioner of Patents and Trademarks